United States Patent
Agarwal et al.

(10) Patent No.: US 7,660,971 B2
(45) Date of Patent: Feb. 9, 2010

(54) METHOD AND SYSTEM FOR DEPENDENCY TRACKING AND FLUSH RECOVERY FOR AN OUT-OF-ORDER MICROPROCESSOR

(75) Inventors: Vikas Agarwal, Austin, TX (US);
William E. Burky, Austin, TX (US);
Krishnan Kailas, Tarrytown, NY (US);
Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/669,999

(22) Filed: Feb. 1, 2007

(65) Prior Publication Data
US 2008/0189535 A1    Aug. 7, 2008

(51) Int. Cl.
*G06F 9/30* (2006.01)
(52) U.S. Cl. .................................... 712/217
(58) Field of Classification Search ............ None
See application file for complete search history.

(56) References Cited

U.S. PATENT DOCUMENTS 5,758,112 A *   5/1998   Yeager et al. ............... 712/217
5,974,524 A *   10/1999  Cheong et al. .............. 712/23
6,098,167 A *   8/2000   Cheong et al. .............. 712/218
6,751,749 B2 *  6/2004   Hofstee et al. .............. 714/11
7,370,178 B1 *  5/2008   Svendsen et al. ........... 712/217

OTHER PUBLICATIONS

Moudgill, Mayan, Pingali, Keshav, Vassiliadis, Stamatis. "Register renaming and dynamic speculation: an alternative approach" Sep. 1993.*

* cited by examiner

*Primary Examiner*—Eddie P Chan
*Assistant Examiner*—Jacob Petranek
(74) *Attorney, Agent, or Firm*—Dillon & Yudell LLP

(57) ABSTRACT

A method for dependency tracking and flush recovery for an out-of-order processor includes recording, in a last definition (DEF) data structure, an identifier of a first instruction as the most recent instruction in an instruction sequence that defines contents of the particular logical register and recording, in a next DEF data structure, the identifier of the first instruction in association with an identifier of a previous second instruction also indicating an update to the particular logical register. In addition, a recovery array is updated to indicate which of the instructions in the instruction sequence updates each of the plurality of logical registers. In response to misspeculation during execution of the instruction sequence, the processor performs a recovery operation to place the identifier of the second instruction in the last DEF data structure by reference to the next DEF data structure and the recovery array.

15 Claims, 5 Drawing Sheets

METHOD AND SYSTEM FOR DEPENDENCY TRACKING AND FLUSH RECOVERY FOR AN OUT-OF-ORDER MICROPROCESSOR

This invention was made with Government support under DARPA, NBCH3039004. THE GOVERNMENT HAS CERTAIN RIGHTS IN THIS INVENTION.

BACKGROUND OF THE INVENTION

1. Technical Field

The present invention relates in general to data processing systems and in particular to microprocessors. Still more particularly, the present invention relates to an improved method and system for dependency tracking and flush recovery for an out-of-order microprocessor.

2. Description of the Related Art

Early microprocessors executed only one instruction at a time and executed instructions in an order determined by the compiled machine-language program running on the microprocessor. Such microprocessors are known as "sequential" microprocessors. Various techniques, such as pipelining, superscaling, and speculative instruction execution, are utilized to improve the performance of sequential microprocessors. Pipelining breaks the execution of instructions into multiple stages, in which each stage corresponds to a particular execution step. Pipelined designs enable new instructions to begin executing before previous instructions are finished, thereby increasing the rate at which instructions can be executed.

"Superscalar" microprocessors typically include multiple pipelines and can process instructions in parallel using two or more instruction execution pipelines in order to execute multiple instructions per microprocessor clock cycle. Parallel processing requires that instructions be dispatched for execution at a sufficient rate. However, the execution rate of microprocessors has typically outpaced the ability of memory devices and data busses to supply instructions to the microprocessors. Therefore conventional microprocessors utilize one or more levels of on-chip cache memory to increase memory access rates.

Cache memory includes one or more levels of dedicated high-speed memory for storing recently accessed instructions and data. Cache memory technology is based on the premise that microprocessors frequently re-execute the same instructions and/or execute different instructions using recently accessed data. When data is read from main memory, the cache memory saves a copy of the data and an index corresponding to the location in main memory. The cache system monitors subsequent requests for data to see if any requested information is already stored in the cache. If the cache system finds that requested data is stored in the cache, often referred to as a cache "hit", the data is delivered immediately to the microprocessor from the cache. If requested data is not currently stored in the cache, often referred to a cache "miss", the requested data is fetched directly from main memory and saved in the cache for future use.

Superscalar microprocessors can process instructions simultaneously only when no data dependencies exist between the instructions in each of the pipelines. An instruction that depends on one or more preceding instructions to load required data into working operand registers cannot execute until all of the required data have been retrieved from cache or main memory. Furthermore, execution units can not predict how long it may take to load data into the working operand registers. Older microprocessors handled this uncertainty by delaying execution until the required data is fetched (i.e., by "stalling" the execution pipeline). This stalling was inconsistent with high-speed processing requirements.

Conventional microprocessors utilize speculative instruction execution to addresses pipeline stalls by enabling a second instruction that is data dependent on a first instruction to enter an execution pipeline before the first instruction has passed completely through the execution pipeline. Thus, in speculative execution microprocessors, the data dependent second instruction, which is often referred to as a consumer instruction, depends on the first instruction, which is referred to as a producer instruction.

In microprocessors that utilize speculative instruction execution, there is a delay between the decision to issue an instruction and the actual execution of the instruction. Thus, in the case of load instructions, there may be a significant delay between the issue of a load instruction and the corresponding data fetch from cache memory. A consumer load instruction, dependent on a delayed producer instruction, may be issued before confirmation by the cache system that the required load data required is available in the cache. When the required data is not found in the cache, dependent consumer load instructions can execute and access incorrect data.

In order to maintain correctness, microprocessors flush incorrectly executed speculative instructions and their results. Conventional microprocessors detect and correct such misspeculation by tracking instruction dependencies using large physical register mappers. The register mappers enable dependency chains to be established based on physical register names. However these register mappers are complex and typically rely on content-addressable memory (CAM) functions to concurrently evaluate large numbers of physical registers. To enable recovery from cache flushes, microprocessors also save a previous physical register state for each instruction group and for each physical register type, thus requiring a large amount of memory area and slowing the process of register state recovery. Consequently, an improved method for dependency tracking and flush recovery for an out-of-order microprocessor is needed.

SUMMARY OF THE INVENTION

A method and system for dependency tracking and flush recovery for an out-of-order processor are disclosed. According to one embodiment of the method, an identifier of a first instruction in an instruction sequence is recorded in a last definition (DEF) data structure as the most recent instruction in the instruction sequence that defines contents of the particular logical register. The identifier of the first instruction is also recorded in a next DEF data structure in association with an identifier of a previous second instruction also indicating an update to the particular logical register. In addition, a recovery array is updated to indicate which of the instructions in the instruction sequence updates each of the plurality of logical registers. In response to misspeculation during execution of the instruction sequence, the processor performs a recovery operation to place the identifier of the second instruction in the last DEF data structure by reference to the next DEF data structure and the recovery array.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
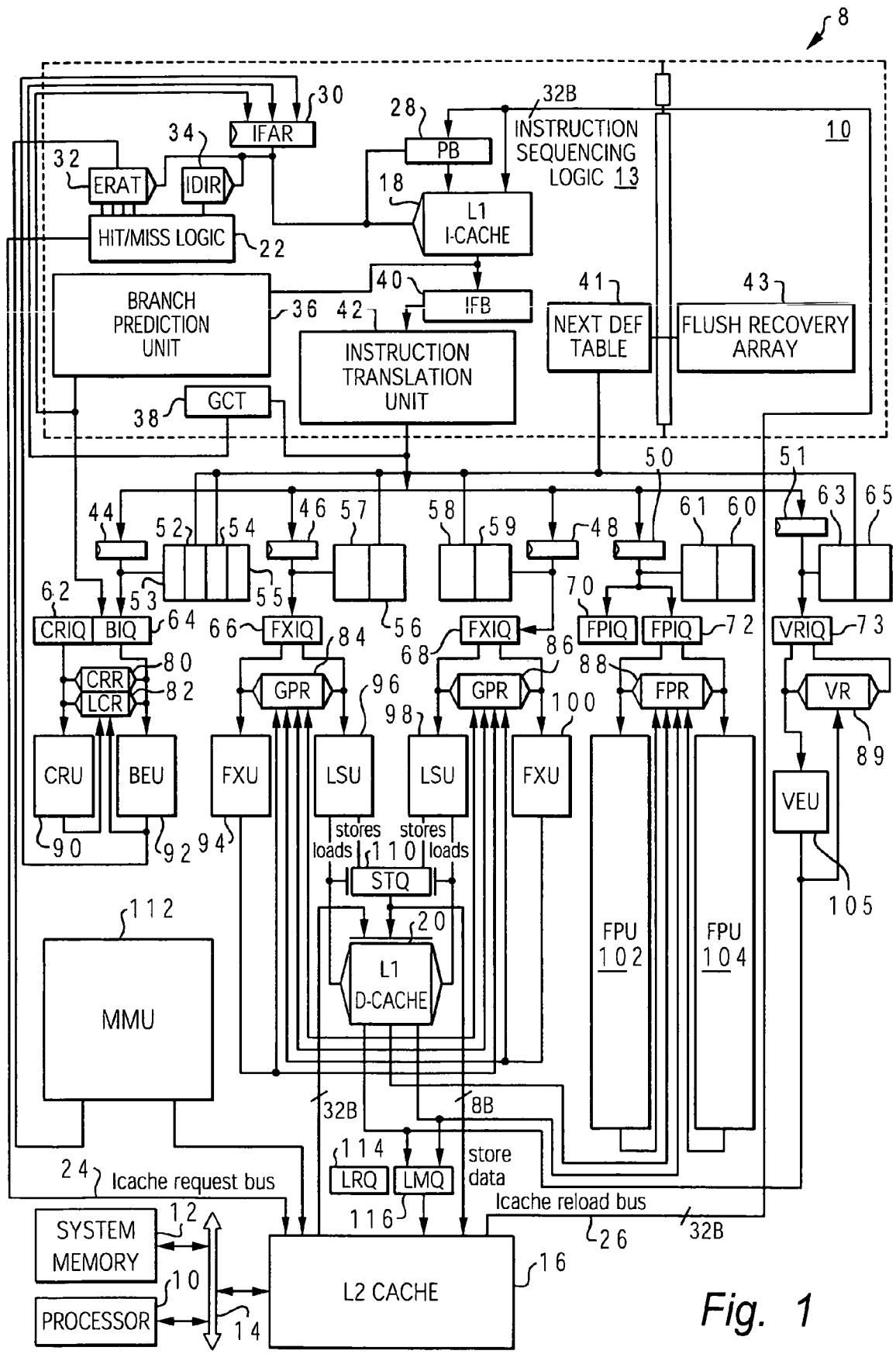
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of at least three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48, 50, and 51 according to instruction type. That is, branch instructions and other condition register (CR) modifying instructions are dispatched to latch 44, fixed-point and load-store instructions are dispatched to either of latches 46 and 48, floating-point instructions are dispatched to latch 50, and vector instructions are dispatched to latch 57. Each instruction requiring a rename register for temporarily storing execution results is then assigned one or more registers within a register file by the appropriate one of CR mapper 53, link and count register (LCR) mapper 55, exception register (XER) mapper 57, general-purpose register (GPR) mapper 59, floating-point register (FPR) mapper 61, and vector register (VR) mapper 65. According to the illustrative embodiment, register mapping may be performed by a simplified register file mapper, a reorder buffer (ROB), or other similar devices known to those skilled in the art. Register file mapping can thus be performed at instruction issue time or close to result write-back time, thereby reducing the lifetimes of allocated renames and increasing the efficiency of rename usage.

Figure 2A:
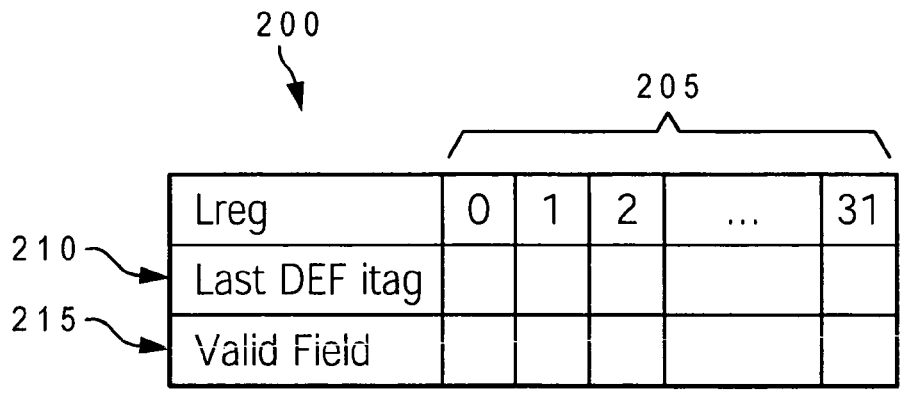
FIG. 2A illustrates a last definition (DEF) table in accordance with the present invention.

Instruction sequencing logic 13 tracks the allocation of register resource to each instruction using the appropriate one of CR last definition (DEF) table 52, LCR last DEF table 54, XER last DEF table 56, GPR last DEF table 58, FPR last DEF table 60, and VR last DEF table 63. An exemplary last DEF table is illustrated in FIG. 2A and described in detail below.

Figure 3:
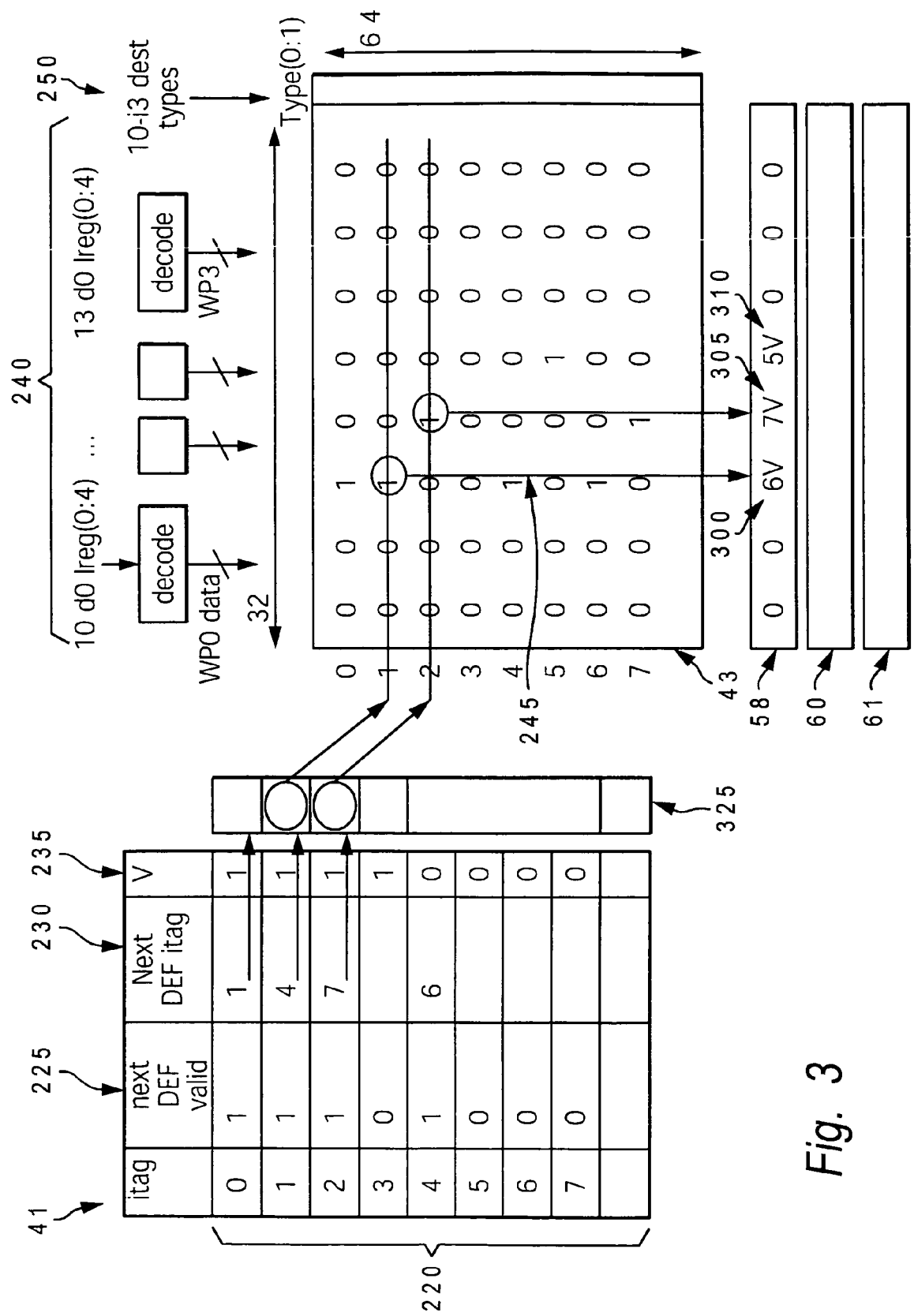
FIG. 3 illustrates a dependency tracking and flush recovery apparatus performing an exemplary flush recovery for an out-of-order microprocessor in accordance with the present invention.
Figure 4:
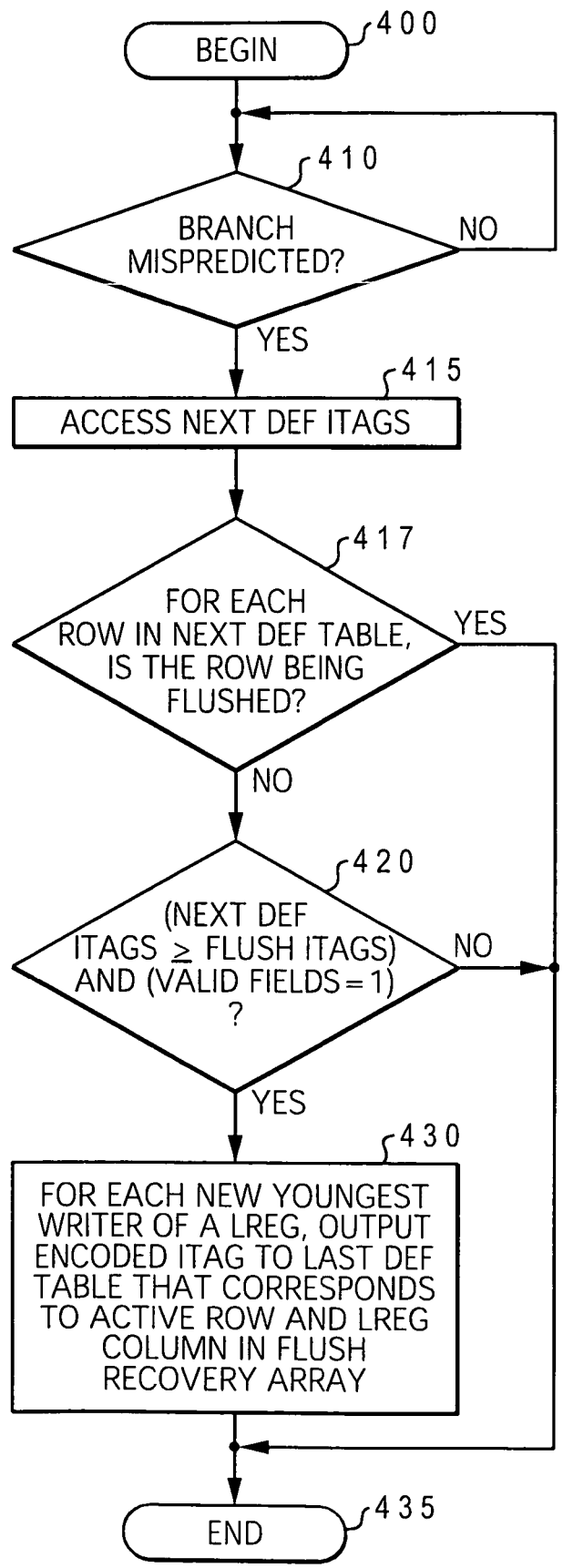
FIG. 4 is a high level logical flowchart of an exemplary method of dependency tracking and flush recovery for an out-of-order microprocessor in accordance with one embodiment of the present invention.

Data processing system 8 also includes flush recovery array 43, which is coupled to next DEF tables 41. Flush recovery array 43 enables instruction sequencing logic 13 to utilize next DEF tables 41 to track instruction data dependencies and perform flush recovery operations, as illustrated in FIGS. 3-4 and discussed below.

After latches 44, 46, 48, 50, and 51, the dispatched instructions are temporarily placed in an appropriate one of CR issue queue (CRIQ) 62, branch issue queue (BIQ) 64, fixed-point issue queues (FXIQs) 66 and 68, floating-point issue queues (FPIQs) 70 and 72, and VR issue queue (VRIQ) 73. From issue queues 62, 64, 66, 68, 70, 72, and 73, instructions can be issued opportunistically (i.e., possibly out-of-order) to the execution units of processor 10 for execution. In some embodiments, the instructions are also maintained in issue queues 62-73 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, two floating-point units (FPUs) 102 and 104 for executing floating-point instructions, and vector execution unit (VEU) 105 for executing vector instructions. Each of execution units 90-105 is preferably implemented as an execution pipeline having a number of pipeline stages.

During execution within one of execution units 90-105, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. Similarly, when executing vector instructions, VRU 105 accesses the VR register file 89, which in a preferred embodiment contains multiple VRs and a number of VR rename registers. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100, FPUs 102 and 104, or VEU 105, GCT 38 signals the appropriate last DEF table. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, BPU 36 updates its prediction facilities, if necessary. If, however, the calculated path address does not match the predicted path address, BEU 92 supplies the correct path address to IFAR 30, and BPU 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

With reference now to FIG. 2A, there is depicted last definition (DEF) table 200 in accordance with the present invention. Data processing system 8 preferably implements a respective last DEF table 200 for each of last DEF tables 52, 54, 56, 58, 60, and 63.

In one embodiment, last DEF table 200 includes multiple columns 205, each of which corresponds to a particular logical register (LREG) that may be referenced by an instruction. Each column 205 further includes at least two fields, including at least a last DEF instruction tag (ITAG) field 210 and valid field 215. According to the illustrative embodiment, an associated register file such as one of GPR files 84, 86, FPR file 88, or VR file 89 includes 120 physical registers to which 32 LREGs can be physically mapped by a register file mapper or ROB device. Utilizing LREGS instead of physical registers as index values into last DEF table 200 enables last DEF table 200 to occupy less space and have more rapid access than mappers tracking register use by physical register number. Although the depicted embodiment has 32 columns corresponding to 32 LREGs in an associated register file, it should be appreciated that different ones of last DEF tables 52, 54, 56, 58, 60, and 63 may have different sizes, depending upon the desired number of architected registers.

In one embodiment, last DEF table 200 utilizes one write port per instruction, and write port orthogonality is ensured via intra-group write after write (WAW) predecodes. Similarly, the read outputs of last DEF table 200 can be bypassed via intra-group read after write (RAW) predecodes. Instruction sequencing logic 13 can thus utilize multiple last DEF tables 200 and instruction dispatch groups to process multiple simultaneous instructions, to prioritize instructions, and/or to identify duplicate instructions. Since the instruction tags recorded within last DEF table 200 are read addresses, content-addressable memory (CAM) functions are not required for instruction source lookup.

When instruction sequencing logic 13 issues a new instruction, the last DEF ITAG field 210 corresponding to the logical register(s) written/defined by the instruction are updated with the ITAG of the instruction. Thus, last DEF table 200 always reflects the identities of the "youngest" instructions that define the LREGs in the associated register file. As utilized herein, the "youngest" ITAG refers to a unique instruction identifier that corresponds to the most recent instruction that writes or overwrites a particular LREG. When a last DEF ITAG field 210 is updated, the associated valid field 215 is also updated to a valid state. The contents of fields 210 and 215 are utilized during the processes of dependency tracking and flush recovery, which are illustrated in FIGS. 3-4 and discussed below.

Figure 2B:
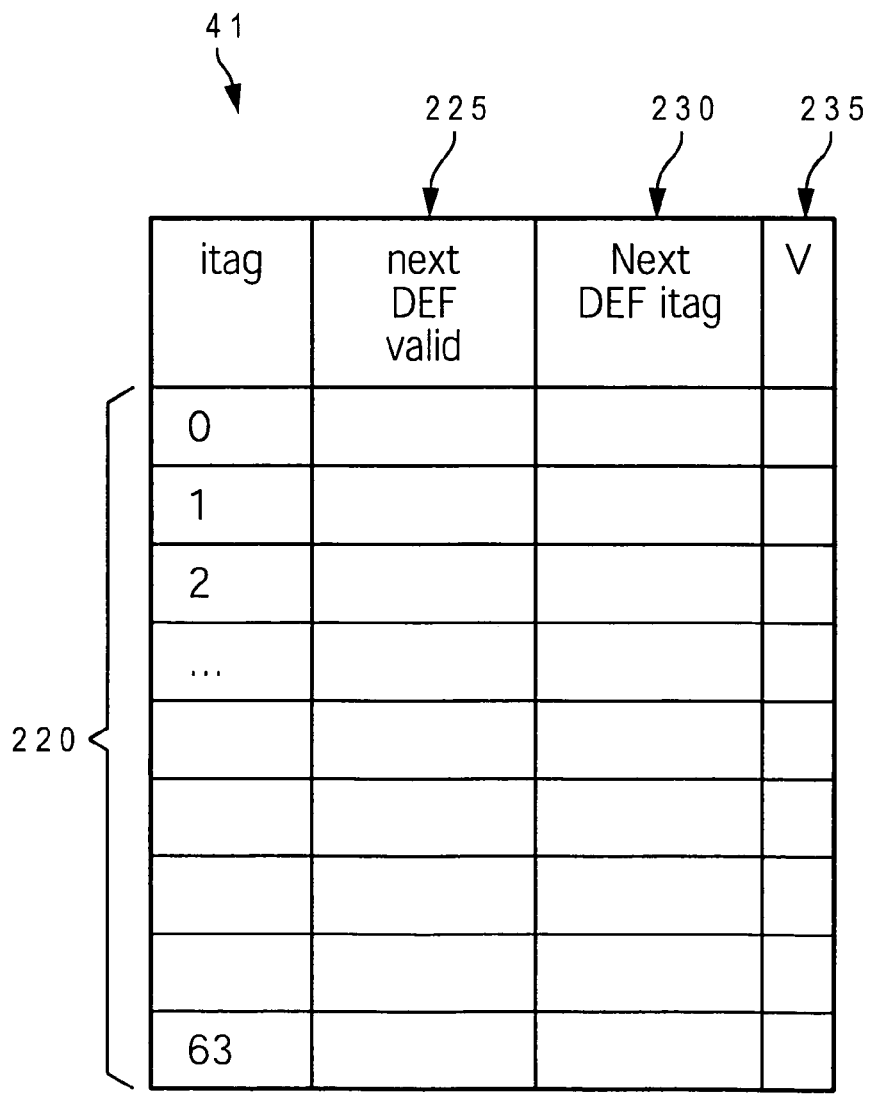
FIG. 2B illustrates a next DEF table in accordance with the present invention.

With reference now to FIG. 2B, there is illustrated a more detailed view of next DEF table 41 of data processing system 8 in accordance with the present invention. Next DEF table 41 includes multiple rows 220, each of which corresponds to a particular one of the 64 possible ITAGs that can concurrently be "in flight" in an exemplary embodiment of the instruction pipeline. Next DEF table 41 also includes, for each ITAG, a next DEF valid field 225, next DEF ITAG field 230, and valid field 235. When instruction sequencing logic 13 writes a new "youngest" DEF ITAG into a last DEF table 200 (from FIG. 2A), instruction sequencing logic 13 also writes the ITAG, if any, that the "youngest" instruction replaced into next DEF ITAG field 230 of the appropriate entry of next DEF table 41 and sets next DEF valid field 235 (e.g., to a "1"). Next DEF valid field 235 thus indicates whether the LREG, if any, modified by an instruction (which is identified by next DEF ITAG field 230) has been overwritten by another "younger" instruction.

Figure 2C:
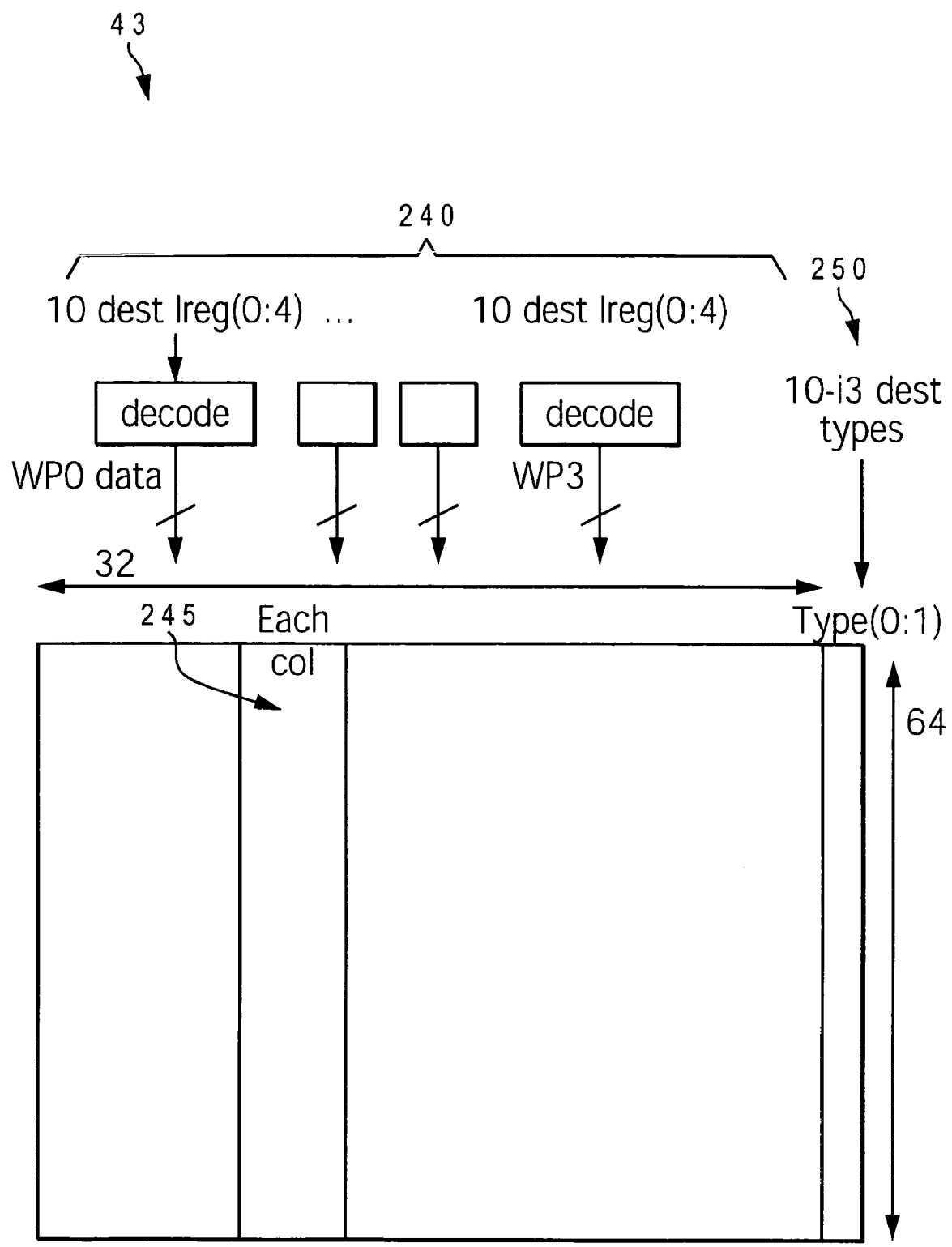
FIG. 2C illustrates a flush recovery array in accordance with the present invention.

With reference now to FIG. 2C, there is depicted flush recovery array 43 in accordance with an embodiment of the present invention. Flush recovery array 43 includes multiple (e.g., 32) decode columns 245, each corresponding to a respective LREG identifier within data processing system 8, and multiple (e.g., 64) rows, each uniquely corresponding to a particular one of the multiple ITAGs that can currently be assigned to instructions "in flight". Thus, each storage location (e.g., 1-bit cell) in flush recovery array 43 indicates whether a particular LREG identifier is written by the instruction identified by a particular ITAG.

According to the illustrative embodiment, data processing system 8 employs orthogonal register sets, meaning that at most one register set is accessed by each instruction. Consequently, each ITAG can be associated with an update to, at most, a single register type (e.g., GPR, FPR, or VR). The specific register file to which the LREG identifier maps is indicated by encoded bits within destination type column 250. Instruction sequencing logic 13 writes flush recovery array 43 at the time instructions are dispatched. In the depicted embodiment, flush recovery array 43 has 4 write ports 240 including decoders in order to support concurrent dispatch by instruction sequencing logic 13 of 4 instructions.

When recovery is required, flush recovery array 43 outputs encoded values that represent which ITAGs should be indicated by as the new "youngest" instructions in last DEF table 200 (from FIG. 2A). In one embodiment, instruction sequencing logic 13 accesses flush recovery array 43 in three sequential cycles and utilizes binary values encoded within destination type column 250 to determine which register type's last DEF table 200 to update (i.e., GPR last DEF table 58, FPR last DEF table 60, or VR last DEF table 63). In an alternate embodiment, instruction sequencing logic 13 may utilize a single six-bit "one-hot" encoded destination type to update all last DEF tables 200 during a single access cycle.

With reference now to FIG. 3, there is depicted a dependency tracking and flush recovery apparatus performing an exemplary flush recovery operation for a processor 10 in accordance with the present invention. The apparatus includes a next DEF table 41, a flush recovery array 43, and last DEF tables 58, 60, and 63 as previously described. In addition, FIG. 3 also includes flush ITAG vector 325, which enables instruction sequencing logic 13 to compare data from next DEF tables 41 (i.e., vectors representing new "youngest" ITAGs) to values within flush recovery array 43, as illustrated in block 420 of FIG. 4, which is discussed below.

In the exemplary processing scenario, processor 10 executes the following sequence of instructions:

0: add r2, r9, r3
1: add r2, r9, r4
2: add r3, r2, r9
3: bc (branch mispredicted)
4: add r2, r3, r9
5: add r4, r2, r9
6: add r2, r7, r4
7: add r3, r2, r2

In this instruction sequence, the initial numeral (e.g., 0, 1, 2, . . . , 7) represents the ITAG assigned to the instruction by instruction sequencing logic 13, the next field is a mnemonic representing the operation code of the instruction (e.g., add or conditional branch), the third field designates the target logical register, if any, written by the instruction, and the final two fields designate the logical registers holding the input operands.

As instruction sequencing logic 13 sequentially issues the instructions in the instruction sequence, instruction sequencing logic 13 first assigns an ITAG of "0" to last DEF ITAG field 210 for LREG 2 in GPR last DEF table 58 as shown at reference number 300, since the fixed-point instruction for ITAG 0 (i.e., add r2, r9, r3) updates LREG 2. Instruction sequencing logic 13 also sets the associated valid field 215, as indicated in FIG. 3 by a "V." Instruction sequencing logic 13 further sets the cell corresponding to ITAG 0 and LREG 2 (i.e., row 1, column 3) within flush recovery array 43 to "1" to indicate that ITAG 0 updates LREG 2 in case this information is later required in a future flush recovery operation.

When instruction sequencing logic 13 issues the instruction assigned ITAG 1, instruction sequencing logic 13 overwrites the last DEF ITAG field 210 for LREG 2 in GPR last DEF table 58 with "1" (i.e., ITAG 1) since ITAG 1 also updates GPR LREG 2. In order to track the previous value (i.e., ITAG 0), instruction sequencing logic 13 sets the next DEF ITAG field 230 within next DEF table 41 corresponding to ITAG 0 to "1" to indicate ITAG 1 has overwritten ITAG 0 and sets the associated next DEF valid field 225. Instruction sequencing logic 13 also sets the cell corresponding to ITAG 1 and LREG 2 (i.e., row 2, column 3) within flush recovery array 43 to indicate the instruction corresponding to ITAG 1 has written LREG 2.

When instruction sequencing logic 13 issues the instruction assigned ITAG 2, instruction sequencing logic 13 assigns "2" (i.e., ITAG 2) to the last DEF ITAG field 210 for LREG 3 in GPR last DEF table 58 as shown at reference numeral 305, since ITAG 2 updates GPR LREG 3. Instruction sequencing logic 13 also sets the associated valid field 215, as indicated in FIG. 3 by a "V." Instruction sequencing logic 13 further sets the cell corresponding to ITAG 2 and LREG 3 (i.e., row 3, column 4) within flush recovery array 43 to indicate the instruction corresponding to ITAG 2 updates LREG 3.

When instruction sequencing logic 13 issues the instruction assigned ITAG 4, instruction sequencing logic 13 overwrites the last DEF ITAG field 210 for LREG 2 in GPR last DEF table 58 with "4" (i.e., ITAG 4) since ITAG 4 also updates GPR LREG 2. In order to track the previous value (i.e., ITAG 1), instruction sequencing logic 13 sets the next DEF ITAG field 230 within next DEF table 41 corresponding to ITAG 1 to "4" to indicate ITAG 4 has overwritten ITAG 1 and sets the associated next DEF valid field 225. Instruction sequencing logic 13 also sets the cell corresponding to ITAG 4 and LREG 2 (i.e., row 5, column 3) within flush recovery array 43 to indicate the instruction corresponding to ITAG 4 updates LREG 2.

When instruction sequencing logic 13 issues the instruction assigned ITAG 5, instruction sequencing logic 13 assigns "5" (i.e., ITAG 5) to the last DEF ITAG field 210 for LREG 4 in GPR last DEF table 58 as indicated at reference numeral 310, since ITAG 5 updates GPR LREG 4. Instruction sequencing logic 13 also sets the associated valid field 215, as indicated in FIG. 3 by a "V." Instruction sequencing logic 13 further sets the cell corresponding to ITAG 5 and LREG 4 (i.e., row 6, column 5) within flush recovery array 43 to indicate the instruction corresponding to ITAG 5 updates LREG 4.

When instruction sequencing logic 13 issues the instruction assigned ITAG 6, instruction sequencing logic 13 overwrites the last DEF ITAG field 210 for LREG 2 in GPR last DEF table 58 with "6" (i.e., ITAG 6) since ITAG 6 also updates GPR LREG 2. In order to track the previous value (i.e., ITAG 4), instruction sequencing logic 13 sets the next DEF ITAG field 230 within next DEF table 41 corresponding to ITAG 4 to "6" to indicate ITAG 6 has overwritten ITAG 4 and sets the associated next DEF valid field 225. Instruction sequencing logic 13 also sets the cell corresponding to ITAG 6 and LREG 2 (i.e., row 7, column 3) within flush recovery array 43 to indicate the instruction corresponding to ITAG 6 writes LREG 2.

Finally, when instruction sequencing logic 13 issues the instruction assigned ITAG 7, instruction sequencing logic 13 overwrites the last DEF ITAG field 210 for LREG 3 in GPR last DEF table 58 with "7" (i.e., ITAG 7) since ITAG 7 also updates GPR LREG 3. In order to track the previous value (i.e., ITAG 2), instruction sequencing logic 13 sets the next DEF ITAG field 230 within next DEF table 41 corresponding to ITAG 2 to "7" to indicate ITAG 7 has overwritten ITAG 2 and sets the associated next DEF valid field 225. Instruction sequencing logic 13 also sets the cell corresponding to ITAG 7 and LREG 3 (i.e., row 8, column 4) within flush recovery array 43 to indicate the instruction corresponding to ITAG 7 updates LREG 3.

When instruction sequencing logic 13 thereafter detects a mispredicted instruction, instruction sequencing logic 13 initiates a flush recovery operation, as illustrated in FIG. 4 and discussed below. During the flush recovery operation, instruction sequencing logic 13 clears all ITAGs that issued after the mispredicted instruction from GPR last DEF table 58, FPR last DEF table 60, VR last DEF table 63, and next DEF table 41 using flush recovery array 43. Instruction sequencing logic 13 then restores, for each affected LREG, the "youngest" ITAG that wrote the LREG that issued before the mispredicted branch instruction. According to the illustrative embodiment of FIG. 3, it is assumed that the branch instruction corresponding to ITAG 3 was mispredicted and that the "youngest" ITAGs that wrote the LREGs that issued before the mispredicted branch instruction are ITAGs 0-2. According to the process of FIG. 4, instruction sequencing logic 13 accordingly updates LREG 2 value 300 from "6" to "1", updates LREG 3 value 305 from "7" to "2", and clears valid field 215 from LREG 4 value 310, which was originally not overwritten until after the mispredicted branch instruction.

Tuning now to FIG. 4, there is illustrated a high level logical flowchart of an exemplary method of dependency tracking and flush recovery for an out-of-order microprocessor in accordance with one embodiment of the invention. The process begins at block 400 and then proceeds to block 210, which depicts instruction sequencing logic 13 determining whether or not a branch instruction has been mispredicted, for example, in response to a signal from BEU 92. If instruction sequencing logic 13 has not detected a mispredicted branch, the process iterates at block 410 until a mispredicted branch instruction is detected. If instruction sequencing logic 13 detects a mispredicted branch instruction, instruction sequencing logic 13 accesses each of the values in next DEF ITAG field 230 within next DEF table 41 and utilizes a read port to access flush ITAG vector 325, as depicted in block 415.

At block 417, a determination is made for each row within next DEF table 41 (i.e., for each ITAG 220) whether the row is being flushed. For each row within next DEF table 41 that is being flushed, instruction sequencing logic 13 takes no further action for that row, and processing of that row terminates, as depicted in block 435. For each row within next DEF table 41 that is not being flushed, the process proceeds to block 420.

At block 420, a determination is made whether the magnitude of the values within next DEF ITAG field 230 are greater than or equal to the magnitude of flush ITAG vector 325, and whether the valid fields 235 corresponding to the values within next DEF ITAG field 230 are set. For each ITAG within next DEF table 41 that has a magnitude of the next DEF ITAG field 230 that is less than the magnitude of flush ITAG vector 325 or has a valid field 235 that is not set, instruction sequencing logic 13 takes no further action, and processing of such ITAGs terminates, as shown in block 435.

For each ITAG within next DEF table 41 for which the magnitude of the next DEF ITAG field 230 is greater than or equal to the magnitude of flush ITAG vector 325 and a set valid field 235 (i.e., for each valid next DEF ITAG field 230 that was dispatch subsequent to the mispredicted branch instruction), instruction sequencing logic 13 writes the ITAG 220 to the appropriate field 210 in last DEF table 200 by utilizing flush recovery array 43, as depicted in block 430. Instruction sequencing logic 13 accesses each row within flush recovery array 43 that corresponds to the each valid ITAG row 220 for which next DEF ITAG field 230 is greater than or equal to the magnitude of flush ITAG vector 325, and utilizes destination type field 250 to determine which last DEF ITAG field 210 (i.e., LREG) within each last DEF table 200 to update. For example, if the next DEF ITAG field 230 of ITAG 1 in next DEF table 41 contains a flushed ITAG, instruction sequencing logic 13 accesses the row corresponding to ITAG 1 (i.e., the second row) of flush recovery array 43 and locates a "1" in a particular decode column 245 (i.e., the column of the corresponding LREG). Instruction sequencing logic 13 utilizes destination type field 250 to determine which last DEF table 200 ITAG 1 corresponds to and overwrites last DEF ITAG field 210 in the appropriate column (i.e., LREG) with the value in next DEF ITAG field 230. Instruction sequencing logic 13 thus utilizes flush recovery array 43 to quickly update GPR last DEF table 58, FPR last DEF table 60, and VR last DEF table 63 in parallel with the appropriate encoded ITAGs that wrote LREGs. The flush recovery process then terminates at block 435.

The present invention thus enables data processing system 8 to utilize multiple small last DEF tables 200 indexed by logical register (instead of physical register like conventional mappers), to track instruction dependencies during speculative instruction execution. Furthermore, the present invention enables data processing system 8 to utilize flush recovery array 43 to quickly restore instruction dependencies during out-of-order execution. The encoded parallel output of flush recovery array 43 eliminates the need for complicated register mappers and CAM functions, thereby reducing the area required for instruction dependency tracking logic and increasing the speed of flush recovery operations through the use of a custom register file based approach.

While the invention has been particularly shown and described with reference to a preferred embodiment, it will be understood by those skilled in the art that various changes in form and detail may be made therein without departing from the spirit and scope of the invention. Although the illustrative embodiment utilizes last DEF tables 200 and next DEF table 41, in other embodiments various alternative data structures may be utilized.

What is claimed is:

1. In a processor, a method comprising:
   in response to receipt of an instruction sequence including instructions, said instructions including a first instruction indicating an update to a particular logical register among a plurality of logical registers and a previous second instruction also indicating an update to the particular logical register:
   in a register mapper, mapping said particular logical register to a physical register among a plurality of physical registers within a register file of the processor and recording the mapping between the particular logical register and the physical register;
   in a last definition (DEF) data structure, recording an identifier of the first instruction as a most recent instruction in the instruction sequence that defines contents of the particular logical register;
   in a next DEF data structure, recording the identifier of the first instruction in association with an identifier of the previous second instruction;
   in a recovery data array having in a first dimension multiple columns each corresponding to respective one of the plurality of logical registers and having in a second dimension multiple rows each corresponding to a respective one of a plurality of possible instruction identifiers including the identifier of the first instruction, indicating which of the instructions in the instruction sequence updates said plurality of logical registers;
   executing instructions in the instruction sequence, wherein the executing includes executing at least some of the instructions speculatively; and
   in response to misspeculation during execution of the instruction sequence, performing a recovery operation to place the identifier of the previous second instruction in the last DEF data structure by reference to said next DEF data structure and said recovery data array.

2. The method of claim 1, wherein:
   said processor includes multiple orthogonal register files including the register file;
   said method includes implementing a respective one of a plurality of last DEF data structures for each the multiple orthogonal register files, said plurality of last DEF data structures including the last DEF data structure; and
   said indicating further comprises making entries in said recovery data array for logical registers mapped to any of said multiple orthogonal register files.

3. The method of claim 1, wherein:
   said last DEF data structure comprises a last DEF table;
   said next DEF data structure comprises a next DEF table; and
   recording the identifier of the first instruction comprises recording an instruction tag of the first instruction in said last DEF table and the next DEF table.

4. The method of claim 1, wherein performing said recovery operation comprises:
   in response to the misspeculation, comparing each identifier of an instruction in said next DEF data structure to an indication of a location of the misspeculation in the instruction sequence to determine an instruction identifier set including one or more instruction identifiers each assigned to a respective correctly executed instruction preceding the misspeculation whose target logical register was overwritten subsequent to the misspeculation;
   accessing one or more rows of the recovery data array with the instruction identifier set and outputting, from one or more decode columns of said recovery data array in which a hit occurred in the one or more rows, one or more identifiers of instructions preceding the misspeculation in the instruction sequence; and
   in response to said outputting, updating one or more entries in said last DEF data structure for one or more logical registers identified by the one or more decode columns with said one or more identifiers of instructions preceding the misspeculation, said one or more identifiers of instructions preceding the misspeculation including said identifier of said previous second instruction.

5. The method of claim 4, wherein said updating includes performing all updates to said last DEF data structure required for the recovery operation in a single cycle.

6. The method of claim 1, wherein said recording an identifier of the first instruction comprises recording the identifier of the first instruction at dispatch time.

7. The method of claim 1, wherein:
   said executing includes predicting an outcome of a conditional branch instruction within the instruction sequence; and
   said method further comprises detecting misspeculation of the conditional branch instruction.

8. A processor, comprising:
   instruction sequencing logic that fetches an instruction sequence including instructions for execution, said instructions including a first instruction indicating an update to a particular logical register among a plurality of logical registers and a previous second instruction also indicating an update to the particular logical register;
   a register file including a plurality of physical registers;
   a register mapper that maps said particular logical register to a physical register among the plurality of physical registers within the register file and records the mapping between the particular logical register and the physical register;
   a last definition (DEF) data structure that records an identifier of the first instruction as a most recent instruction in the instruction sequence that defines contents of the particular logical register;
   a next DEF data structure that records the identifier of the first instruction in association with an identifier of the previous second instruction;
   a recovery data array having in a first dimension multiple columns each corresponding to respective one of the plurality of logical registers and having in a second dimension multiple rows each corresponding to a respective one of a plurality of possible instruction identifiers including the identifier of the first instruction, said recovery data array indicating which of the instructions in the instruction sequence updates said plurality of logical registers; and one or more execution units coupled to the register file and the instruction sequencing logic, wherein said one or more execution units execute the instruction sequence and execute at least some of the instructions in the instruction sequence speculatively;

wherein the instruction sequencing logic, responsive to misspeculation during execution of the instruction sequence, causes a recovery operation to be performed to place the identifier of the previous second instruction in the last DEF data structure by reference to said next DEF data structure and said recovery data array.

9. The processor of claim 8, wherein:

said processor includes:

multiple orthogonal register files including the register file; and a plurality of last DEF data structures including the last DEF data structure, wherein each of the plurality of last DEF data structure is associated with a respective one of the multiple orthogonal register files; and said recovery data array includes entries for logical registers mapped to any of said multiple orthogonal register files.

10. The processor of claim 8, wherein:

said last DEF data structure comprises a last DEF table;

said next DEF data structure comprises a next DEF table; and the identifier of the first instruction comprises an instruction tag assigned to the first instruction by the instruction sequencing logic.

11. The processor of claim 8, wherein in said recovery operation, the processor compares each identifier of an instruction in said next DEF data structure with an indication of a location of the misspeculation in the instruction sequence to determine an instruction identifier set including one or more instruction identifiers each assigned to a respective correctly executed instruction preceding the misspeculation whose target logical register was overwritten subsequent to the misspeculation, accesses one or more rows of the recovery data array with the instruction identifier set, and outputs, from one or more decode columns of said recovery data array in which a hit occurred in the one or more rows, one or more identifiers of instructions preceding the misspeculation in the instruction sequence, said one or more identifiers including the identifier of the previous second instruction, and wherein said processor updates one or more entries in said last DEF data structure for one or more logical registers identified by the one or more decode columns with said one or more identifiers of instructions preceding the misspeculation, said one or more identifiers of instructions preceding the misspeculation including said identifier of said previous second instruction.

12. The processor of claim 11, wherein the processor performs all updates to said last DEF data structure required for the recovery operation in a single cycle.

13. The processor of claim 8, said last DEF data structure records the identifier of the first instruction at dispatch time.

14. The processor of claim 8, wherein the instruction sequencing logic includes a branch prediction unit that predicts an outcome of a conditional branch instruction within the instruction sequence.

15. A data processing system, comprising:

at least one processor in accordance with claim 8;

an interconnect fabric coupled to the at least one processor; and a system memory coupled to the interconnect fabric.

* * * * *